United States Patent
Nair et al.

(10) Patent No.: US 12,306,989 B2
(45) Date of Patent: May 20, 2025

(54) METHOD AND SYSTEM FOR SECURE DATA TRANSMISSION

(71) Applicant: MoEngage, Inc., San Francisco, CA (US)

(72) Inventors: Ajish Nair, Pune (IN); Sumit Bansal, Jaipur (IN); Paras Jain, Uttar Pradesh (IN)

(73) Assignee: MoEngage, Inc., San Francisco, CA (US)

( * ) Notice: Subject to any disclaimer, the term of this patent is extended or adjusted under 35 U.S.C. 154(b) by 0 days.

(21) Appl. No.: 18/620,370

(22) Filed: Mar. 28, 2024

(65) Prior Publication Data

US 2025/0117515 A1    Apr. 10, 2025

(30) Foreign Application Priority Data

Oct. 10, 2023 (IN) .............................. 202311067886

(51) Int. Cl.
   *G06F 21/62*   (2013.01)
   *H04L 9/06*    (2006.01)
   *H04L 9/32*    (2006.01)
   *H04L 29/06*   (2006.01)
   *H04L 51/234*  (2022.01)

(52) U.S. Cl.
   CPC ........ *G06F 21/6245* (2013.01); *H04L 9/0643* (2013.01); *H04L 9/3213* (2013.01); *H04L 51/234* (2022.05)

(58) Field of Classification Search
   CPC ........................... G06F 21/6245; H04L 51/234
   See application file for complete search history.

(56) References Cited

U.S. PATENT DOCUMENTS

| | | | |
|---|---|---|---|
| 8,447,983 B1 * | 5/2013 | Beck ..................... | H04L 9/0894 713/172 |
| 8,639,920 B2 | 1/2014 | Stack et al. | |
| 2019/0370487 A1 * | 12/2019 | Veltman ................ | H04L 9/3247 |
| 2020/0076813 A1 * | 3/2020 | Felice-Steele ...... | H04L 63/1441 |
| 2021/0226766 A1 * | 7/2021 | Arunachalam ..... | H04W 56/001 |
| 2021/0256522 A1 * | 8/2021 | Dimmick ........... | G06Q 20/4014 |
| 2022/0123945 A1 | 4/2022 | Yang et al. | |
| 2022/0164474 A1 | 5/2022 | Netke et al. | |

FOREIGN PATENT DOCUMENTS

WO    2022238948 A1   11/2022

* cited by examiner

*Primary Examiner* — Noura Zoubair
(74) *Attorney, Agent, or Firm* — Shumaker, Loop & Kendrick, LLP (57) ABSTRACT

A method for secure transmission of data is described. The method comprises receiving a token corresponding to user data stored in a data storage device. Further, the PII data corresponding to the token is retrieved via an Application Programming Interface (API). The retrieved PII data is processed at a runtime environment for sending information to the users over one or more messages. The PII data is deleted from the runtime environment. Further, delivery data corresponding to delivered one or more messages is mapped with the token using a unique message ID.

16 Claims, 4 Drawing Sheets

METHOD AND SYSTEM FOR SECURE DATA TRANSMISSION

PRIORITY INFORMATION

The present application claims priority from an Indian Patent Application Number: 202311067886, filed on 10 Oct. 2023.

TECHNICAL FIELD

The present subject matter described herein, in general, relates to securely sending information to a user.

BACKGROUND

In the modern digital environment, striking the right balance between protecting user privacy and using Personal Identifiable Information (PII) data for organisational progress has become a crucial challenge. Users today are keenly aware of the risks connected to the misuse of their PII data, which range from identity theft to fraudulent actions. Organisations also recognise the enormous worth of PII data in allowing them to customise their services to meet the interests of specific users. Finding a subtle balance between these two imperatives has assumed prominence. Often, organizations use services of a third-party service provider to broadcast information to users, such as information related to user-specific services, regulatory changes, engagement campaigns, and the like, over various communication channels, such as email, mobile messaging applications, etc. The ability to provide such information while not exposing PII data to the third-party service provider becomes more important with increased regulations around data privacy and user sensitivity.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for processing Personal Identifiable Information (PII) data of a user for running an engagement campaign. This summary is not intended to identify essential features of the claimed subject matter nor is it intended for use in determining or limiting the scope of the claimed subject matter.

In one implementation, a method for secure transmission of data is described. The method comprises receiving a token from a data storage device. The token corresponds to user data stored in the data storage device for a user. Personally Identifiable Information (PII) data is retrieved from the user data corresponding to the token. The PII data is retrieved via an Application Programming Interface (API) call placed to the data storage device using the token. Further, the method includes processing the retrieved PII data in a runtime environment for sending information to the user over one or more messages. The PII data of the user is deleted from the runtime environment on processing the PII data. Finally, the delivery data is mapped corresponding to delivered one or more messages with the token using a unique message ID corresponding to the information sent. In one aspect, the aforementioned method for secure transmission of data may be performed by a processor using programmed instructions stored in a memory.

In yet another implementation, a system for secure transmission of data is disclosed. The system comprises a memory storing one or more instructions and a processor communicatively coupled to the memory. The processor upon execution of the one or more instructions is configured to receive a token from a data storage device. The token corresponds to user data stored in the data storage device for a user. Personally Identifiable Information (PII) data is retrieved from the user data corresponding to the token. The PII data is retrieved via an Application Programming Interface (API) call placed to the data storage device using the token. Further, retrieved PII data is processed in a runtime environment for sending information to the user over one or more messages. The PII data of the user is deleted from the runtime environment on processing the PII data. Finally, the delivery data is mapped corresponding to delivered one or more messages with the token using a unique message ID corresponding to the information sent.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for processing Personal Identifiable Information (PII) data of a user for running an engagement campaign is disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "retrieving," "processing," "deleting," "mapping" and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for secure transmission of data. In particular, the method and system relate to processing user's Personal Identifiable Information (PII) data in a runtime environment. The phrase 'runtime environment,' is used here to define the setting in which a programme or application is executed and used. The PII data is highly sensitive information that is linked to individual users and can provide valuable insights to organizations striving to enhance their operations through targeted marketing and personalized services. Traditional systems present significant challenges in striking the right balance between effectively using PII data and complying to strict privacy protection standards. Because standard data processing methods entail storing the PII data in databases permanently, while and after processing the PII data. Thus, the possibility of data breaches and unauthorized access remains a major concern. It is vital to maintain user privacy while using PII data for different projects. The proposed technique and system, on the other hand, offer an innovative solution to these technical issues.

Figure 1:
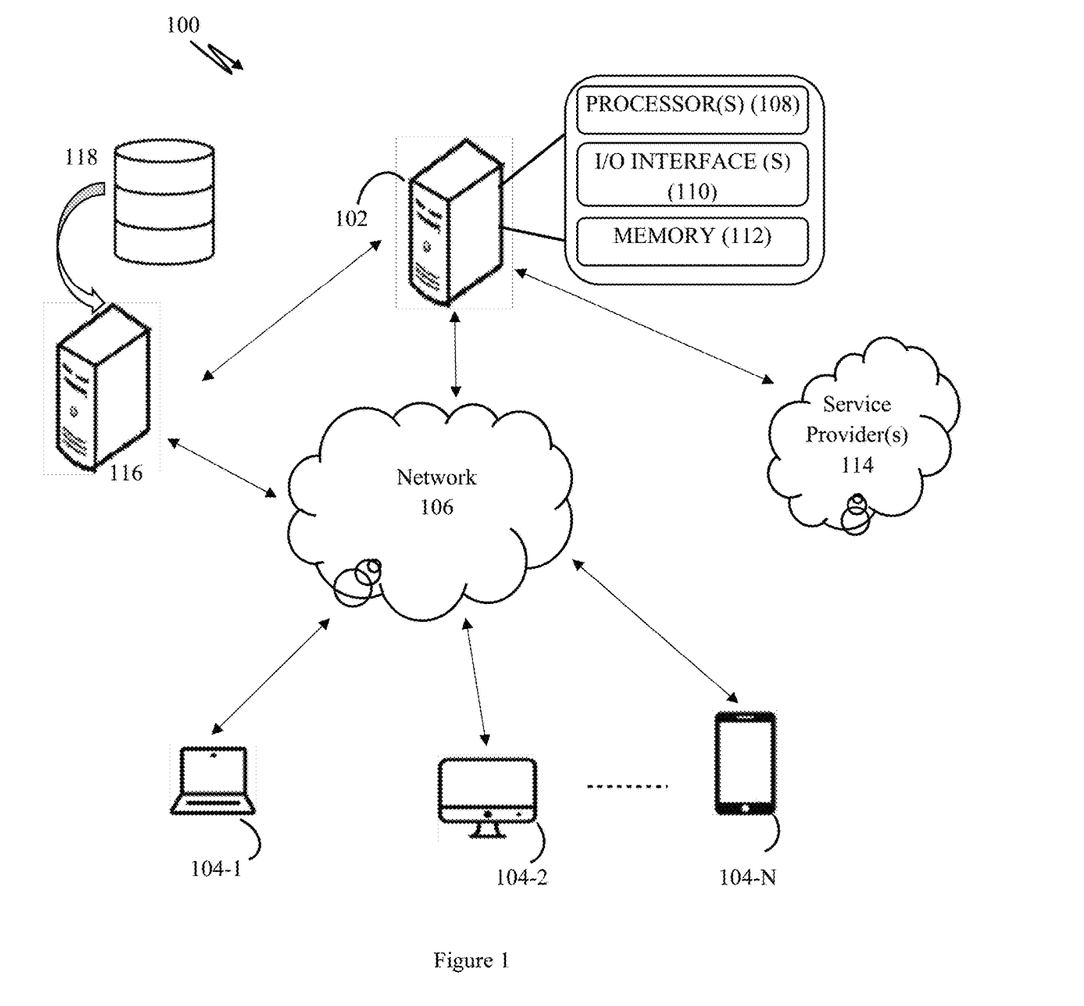
FIG. 1 illustrates a network implementation for securely transmitting data to users, in accordance with various embodiments of the present subject matter.

Referring now to FIG. 1, a network implementation 100 for securely transmitting data to users. The network 100 includes a system 102, one or more user devices 104-N (for example but not limited to one or more user devices 104-1, 104-2 . . . 104-N) associated with one or more users, service provider(s) 114, and data storage device 116. In an embodiment the data storage device 116 may send a token to the system 102 for retrieving user data from the storage device 116. To this end, the system 102 receives the token and retrieve's corresponding PII data of the user via the token and processes the retrieved PII data in the runtime environment. The data storage device 116 may be associated with an entity, such as an organization, business enterprise, companies, individual users, and the like. In one example, the system 102 may also be associated with the same entity as the data storage device 116 or a different entity. The system 102 may be tasked with delivering information/data to the users, based on their PII data stored in the data storage device 116, via the service provider(s) 114. In one example, in order to maintain data security, it is desirable that the PII data is not persistently stored at the system 102.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be in communication with the data storage device 116. In one implementation, the system 102 may comprise the cloud-based computing environment in which the data storage device may operate individual computing systems configured to execute remotely located applications. Further, system 102, data storage device 116, service provider(s) 114, user device 104 may communicate through the network 106. Examples of the user devices 104 may include, but are not limited to, a portable computer, a personal digital assistant, a handheld device, and a workstation.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

In an embodiment, the system 102 may interact with the service provider(s) 114 for delivering one or more messages to the user device 104. The service provider(s) 114 may include at least one of a Short Message Service (SMS) Service Provider and Email Service Provider (ESP) and may be service providers associated with the entity that controls the data storage device 116, thereby giving them more flexibility to use and store PII data of the users. The system 102 may be communicatively coupled with the service provide(s) 114 through the internet network 106. In an embodiment, the system 102 may relay information to the service provider(s) 114 through the network 106.

In an embodiment, the data storage device 116 may be implemented on a server or is a web-service, it may be understood that the data storage device 116 may be implemented in a variety of computing systems, such as a laptop computer, a desktop computer, a notebook, a workstation, a virtual environment, a mainframe computer, a server, a network server, a cloud-based computing environment. The data storage device 116 may at least be associated with one or more databases like 118 for storing data related to the user. The data storage device 116 may include a memory, processor, transmitter, and I/O interface for data processing and transmitting data over the network 106.

As there are various challenges observed in the existing art, the challenges necessitate the need to build the system 102 for processing the PII data of the user in the runtime environment. The detail functioning of the system 102 is described below with the help of one or more figures.

Figure 2:
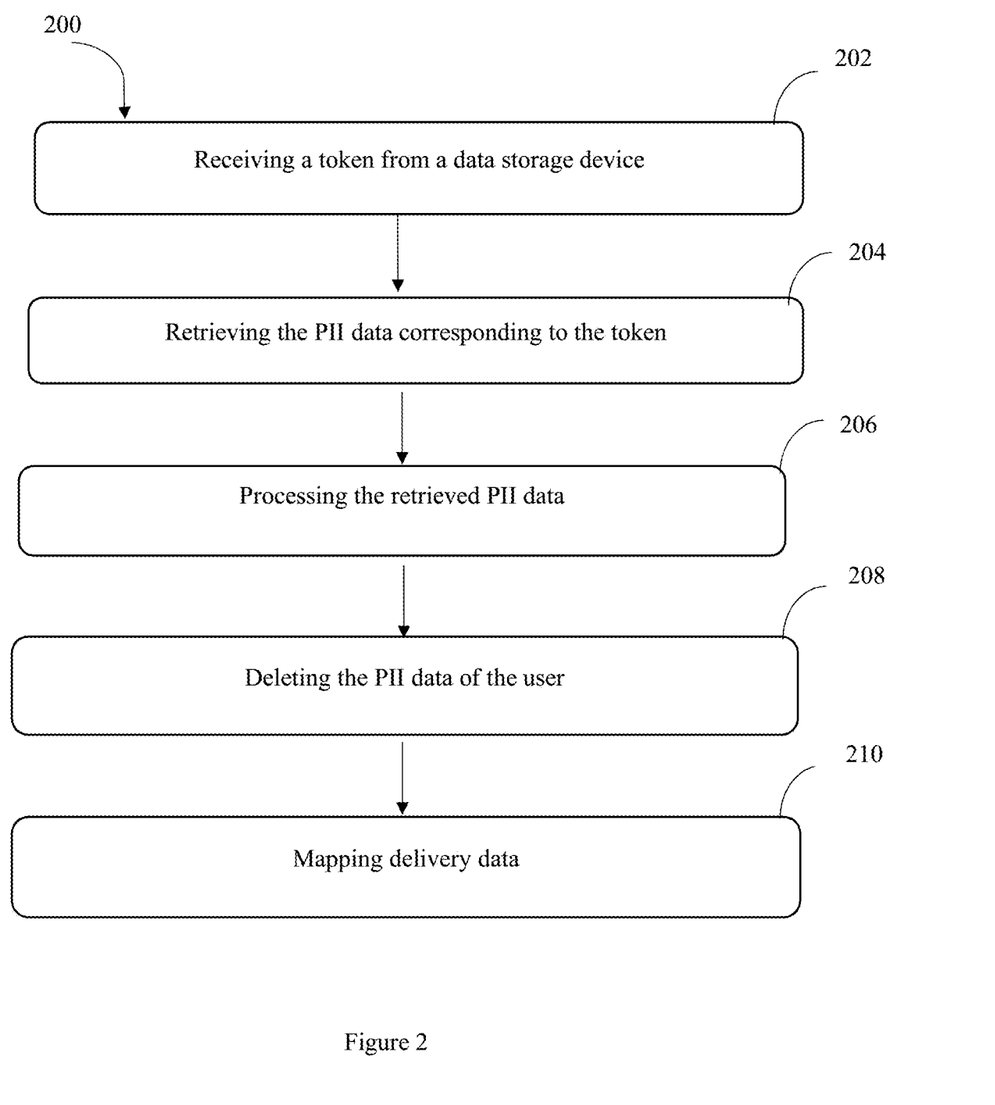
FIG. 2 illustrates a method for secure transmission of data, in accordance with various embodiments of the present subject matter.

Referring now to FIG. 2, a method 200 for securely transmission of data to one or more user devices 104, is shown, in accordance with one or more embodiments of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The method 200 for secure transmission of data may be implemented in any suitable hardware, software, firmware, or combination thereof. However, for ease of explanation, in the embodiments described below, the method 200 may be considered to be implemented in the network 100 of FIG. 1 by the processor(s) 108 of the system 102 in association with the other devices in the network 100.

Initially, at step 202 a processor of the system 102 may be configured to receive a token from the data storage device. The token may correspond to user data stored in the data storage device for a user. In an embodiment, the user data may be stored in a cache memory with the help of a cache key transmitted by the system. For example, the cache key may be a randomly generated string of alphanumeric characters. In an embodiment the cache key may include a user identifier generated for each of the user along with other characters. The user identifier may be a random string like 'ABSR23765' or a combination of the user's name and a unique number. The cache key may be stored, in the data storage device, corresponding to the user data of the user. For example, a cache key "ABSTC1234" may be stored corresponding to a contact number of a user. In an embodiment, the user data may be retrieved using the cache key and the user identifier.

The token corresponding to the stored user data may be generally used to enhance the privacy and security of the users, such that in place of the actual user data, a token corresponding to the user data is shared with the system. The token serves as a unique identifier and may be unique strings of characters, cryptographic keys, or data structures, received via a graphical user interface of the system. In one example, the token may correspond to an anonymous user ID which can be used to access user data from the data storage device.

In an embodiment the token may be received upon triggering of at least one of a user event and a scheduled event at the data storage device end. The user event may be an action like signing up for a service, making a purchase, completing a survey, clicking on a link, or any other activity that signifies user engagement. The user event may be behaviour or interaction initiated by a user within the network. This can encompass a wide range of actions, such as signing up for a service, making a purchase, completing a survey, clicking on a link, or any other activity that signifies user engagement. When the user event occurs, the data storage device detects this action and responds by sending a token to the system 102 for retrieving PII data to send a message/information to the user. This user-centric trigger ensures that token is launched when the user takes specific actions, enhancing the relevance and timeliness of one or more messages delivered. In yet another embodiment, the tokens may be triggered upon occurrence of the scheduled event. The scheduled event is essentially a planned activity and is activated independently of the user input. For example, but not limited to, a scheduled event may be an automatic distribution to users of a promotional offer on the first Monday of each month. Schedule events may be organised in advance and frequently correspond to objectives for user engagement, marketing initiatives, or company goals, and the like. The schedule events may also correspond to messages sent to users for regulatory updates, user education, and the like. The system 102 may receive one or more tokens for sending one or more messages to the users without storing PII data in a database of the system 102. Additionally, the system may perform at least one of: segmenting, personalizing, and engaging with one or more users based on the data received from the data storage device.

Further, at step 204, the system 102 may retrieve the PII data from the user data corresponding to the token in the data storage device. The PII may data include user sensitive information that can be used to identify the user. For example, the PII data may comprise full names, postal addresses, date of birth, phone numbers, email addresses, social security numbers, financial account information, and biometric data, and the like, of the user. The token received at the system 102 may be used to retrieve the PII data. The PII data may be retrieved via an Application Programming Interface (API) call. The Application Programming Interface is a set of rules and protocols that allow different software applications to communicate with each other. In the present scenario, the API acts as an intermediary or bridge between the processor and a source of the PII data for example, the data storage device. The API interface call may be placed to the data storage device using the token. The API provides a standardized way for the processor to make calls for specific PII data using the token, and in return, the system receives the requested data from the data storage device.

In an embodiment, upon receiving the API request, the data storage device may authenticate and verify validity of the received token in the API request call. After successful token authentication and verification, the data storage device may fetch the relevant PII data linked to the received token. The PII data may be fetched from a data storage database associated with the data storage device. In an embodiment, the system may receive a status code form the data storage device in a specific range upon successful API call. In an embodiment, when the API call is not successful, the system may receive an error message indicating that the status code is outside the specific range. In an embodiment the system may receive an error message from the data storage device when the PII data linked with the API call cannot be found. In an embodiment SSL (Secure Sockets Layer)/TLS (Transport Layer Security) certificates may be used to secure the communication between the data storage device and the system. For example, the system may receive an alert upon at least one of: expired certificates, certificates issued by untrusted authorities, or mismatches between the domain name in the certificate and the API server. The system 102, at step 206, processes the retrieved PII data in a runtime environment for sending information to the user over one or more messages. The one or more messages may be generated by the system to deliver specific material, interactions, or calls to action that are relevant to the user. In another example, the system may receive one or more messages from the data storage device to be customized and shared with the users. The system may utilise one or more of: user demographics, surfing patterns, purchasing habits, and even sentiment analysis of prior interactions to generate or customize the one or more messages. The system recognises words, phrases, and contextual clues that align with the user's preferences by utilising natural language processing (NLP) techniques. This makes it possible to create communications that align with the user's interests, increasing the possibility that they will be opened and read. In an embodiment, the system may utilise dynamic content insertion methods. The dynamic content adaptation makes sure that the most pertinent and current information is included in the one or more messages, in real time. This can be adding the most recent deals, sales, or news pieces that are catered to the user's expressed tastes.

In an embodiment, the system 102 relays details of the information to be sent to at least one of an ESP and SSP. In an embodiment, when sending emails as the one or more messages is a requirement, the service provider may be the ESP. The system may relay the information details to the ESP In an embodiment for an ESP, account settings of the respective ESP may be required to ensure that PII is processed securely. For example, configuration changes like enabling encryption or setting up callback APIs to handle PII safely. In yet another embodiment, when sending SMS is the requirement, the service provider may be the SSP. The system may relay the information details to the SSP. In an embodiment, the one or more messages may comprise push notifications.

In an embodiment, the information details relayed to the ESP or SSP may include at least one of a schedule for sending the information, the PII data, the user identifier, and the one or more messages comprising the information. The schedule for sending the information may include but not limited to date, time, delivery frequency, sequence of the one or more messages. In an embodiment while sending the one or more message to the user, the user identifier may be included as a part of the one or more message like SMS or the email. The user identifier may be unique to each user. For example, the subject of the email may include the user identifier, or the user identifier may be as a part of the content of the SMS. The user identifier may be generated by the system 102. The user identifier may be a combination of alphanumeric characters or any other format that ensures uniqueness.

In an embodiment, before sending the email, the PII data for example user's email address may be replaced with the user identifier corresponding to the user. For example, user's email id: abc@example.com may be replaced by the user identifier "ABCDEF". In an embodiment, before sending the SMS, the PII data for example phone number may be replaced with a corresponding user identifier. For example, user's phone number: 1234567890 may be replaced by "XXYYZZ". This may ensure not exposing the PII data during the communication.

In an embodiment the system may replace the corresponding PII data like the email address, user's contact number, and the like with the user identifier and convey this in the transmitted information relayed to the ESP or SSP. In yet another embodiment the system may transmit a request in the relayed information to at least one of the ESP and SSP to mask the PII data with the corresponding user identifier shared in the information before sending one or more messages to the user.

In an embodiment, the system may maintain a cache of the hashes for the one or more messages that have been already sent to the users for example hashes for emails and SMS. In an embodiment, email hash may be created by for example using a hashing function. The hashing function may take the email address as input and calculate a fixed length hash value. The hash value may be unique to the email address. The hash values corresponding to the email address may be stored in a database of the system. In yet another embodiment, SMS hash may be created by for example using a hashing function. The hashing function may take the user contact number as input and calculate a fixed length hash value. The hash value may be unique to the user's contact number. The hash values corresponding to the user's contact number may be stored in the cache of the system. In an embodiment, prior to sharing the information regarding the one or more message to at least one of the ESP and SSP, the system may compare the hash value of the SMS or email to be shared with the user, with the hashes already stored in the cache. If a successful match is found, the system may take action based on a deduplication strategy, such as inhibiting the duplicate message from being sent, logging the occurrence, or notifying the at least one of the ESP and the SSP.

In an embodiment, while processing, the retrieved PII data may be converted in a suitable format to be shared with at least one of the ESP and SSP. In an embodiment, the retrieved PII data may be logically classified into various groups based on criteria such as demographics, geographic location, or user preferences, while processing. In an embodiment, the retrieved PII data may be encrypted while processing. In yet another embodiment, the PII data may be arranged in one or more sequence, while processing. In an embodiment, the retrieved PII data may be checked for duplicity while processing.

In an embodiment, the processing of the retrieved PII data is performed without storing the PII data in a persistent storage device. Digital storage that preserves data even when the computer or other device is turned off is referred to as persistent storage. Persistent storage, as opposed to volatile memory (RAM), which loses its information when the power is turned off, keeps data over time, making it appropriate for long-term storing and data preservation. In an embodiment, the system may involve loading PII data directly into system's volatile memory like Random Access Memory (RAM) for processing, bypassing persistent storage, and therefore making the data unavailable outside of the runtime environment. The processing may occur entirely in the RAM. In an embodiment, the system may retrieve the PII data stored in the cache memory, with the help of the cache key.

Further, at step 208, the system deletes the PII data of the user from the runtime environment on processing the PII data. The deletion at runtime may refer to removing PII data of the user from active memory and temporary storage of a computer system once the processing of that sensitive data is completed. In an embodiment, the system may trigger an automatic deletion of the retrieved PIT data after sending the PII data to at least one of an Email Service Provider (ESP) and a SMS Service Provider (SSP). In yet another embodiment, the PIT data may be stored for a predetermined amount of time in the associated memory before deletion. For example, following the transmission of the PII data to the ESP or SMS, the system may implement a predetermined data retention strategy, in which PII data is maintained within the associated memory following transmission to ESP or SSP for a predetermined period. To this end, the system may check the predetermined retention time and, when it expires, initiates the automatic deletion process.

In an embodiment, once the PIT data is deleted the system may perform verifications to ensure that the PIT data is completely deleted. The system may undertake verification tests to guarantee that the PIT data has been effectively deleted. The verification tests may require comparing the storage's before and after states, in the temporary memory, to confirm the absence of the PIT data. In an embodiment, the system may track the erasing process's information, for example but not limited to timestamp corresponding to deletion, one or more methods used for eraser, and the like. The system may further, generate an acknowledgement to confirm deletion of the identified PIT data. For example, the acknowledgment may be presented as a visual display on the system's interface. The visual display may be in a form of a confirmation message, or a visual icon. In another embodiment, the acknowledgment may be in a form of an audible notification, for example but not limited to a sound, tone, or spoken message, and the like, delivered by speakers or headphones. In yet another embodiment the acknowledgement may be a haptic signal.

At step 210, the system is further configured to map delivery data corresponding to delivered one or more messages with the token using a unique message ID corresponding to the information sent. To this end, the system may generate unique message ID corresponding the information of each of the one or more messages. The unique message ID acts as a digital signature, identifying messages and allowing for smooth tracking. The message ID may allow monitoring of the delivery data being delivered to the users in the one or more messages.

In an embodiment, the system may receive the delivery data corresponding to the delivered one or more messages. For example, upon delivering the one or more messages, at least one of the ESP and the SSP transmits the delivery data to the system. In an embodiment, the delivery data may include at least one of: a timestamp, delivery status, the user identifier, and the unique message ID associated with a message. The timestamp indicates the time at which the one or more messages have been delivered. The delivery status may comprise one or more of delivered, failed, or pending, depending upon the delivery of the one or more messages. In an embodiment, when a failure occurs the system may receive a response message indicating the user identifier as invalid or empty.

Furthermore, the system may perform a verification check on the received delivery data to identify if the delivery data includes the PII data. For example, the system may process the delivery data to identify if the delivery data includes the PII data of the user. In an embodiment, the system processes the delivery data and analyse the metadata associated with the delivery data. The meta data may include one or more of recipient details like name, timestamps, contact numbers, location, or email addresses and the like. The system may use natural language processing techniques to analyse the text within the metadata. Following analysing, the system may identify the PII data and deletes the identified PII data in the delivery data. In an embodiment, the PII data may be deleted from the delivery data when present, prior to the mapping of the delivery data to the token. In an embodiment, the system may store the user identifier received in the delivery data associated with the one or more messages for tracking purposes.

In an embodiment, the system may monitor a delivery status of the one or more messages associated with the message ID. For example, the system tracks the delivery status of each of the one or more messages, which are all uniquely identified by their message IDs. The system monitors each delivery attempt performed by the ESP or SSP by analysing the received delivered data associated with the one or more messages, from these service providers. The delivered data in an example, includes the delivery status of the one or more messages. The delivery status may comprise one or more of delivered, failed, or pending statues of the one or more messages. The system continuously tracks the delivery status of the one or more messages for performing the monitoring.

In an embodiment, the system is configured to display analytics data on a dashboard. The analytics data may include delivery status of the one or more messages. For example, the delivery status, as discussed above, of the messages may be updated in real time on the dashboard. The analytics data may include one or more datapoints associated with the delivery status for example not limited to the time stamps, delivered data, type of server, and the like. The system may display one of the data points like the delivery status via the graphical user interface using the token and the message ID. In yet another embodiment the system may display one or more data points associated with the delivery status.

In an exemplary embodiment, the system 102 of the network 100 performs the above disclosed method in FIG. 2 to process the Personal Identifiable Information (PII) data of a user for running an engagement campaign, without storing the PII data in the persistent storage. The engagement campaigns are launched by organizations to develop meaningful interactions, build relationships, and encourage active participation of users. The key aspects of the engagement campaign include understanding target user's interests, preferences, and demands to tailor the campaign's messaging and actions according to the user. However, the PII data belonging to the user is necessary for the engagement campaign in order to complete the user demand.

In an embodiment, the engagement campaign is triggered by at least one of the user event and the scheduled event. The system 102 may receive one or more token to process the PII data for running one or more engagements campaigns. The system retrieves the PII data corresponding to the one or more tokens via the API call. The PII data is retrieved in the runtime environment upon triggering of the user event or scheduled event. The retrieved PII data is processed and shared with at least one of the ESP or SSP. In an embodiment, when sending emails as messages is a part of the engagement campaign, the service provider may be the ESP.

The system may transmit the engagement campaign details to the ESP. In yet another embodiment, when sending SMS is a part of the engagement campaign, the service provider may be the SSP. The system may transmit the engagement campaign details to the SSP.

Figure 3:
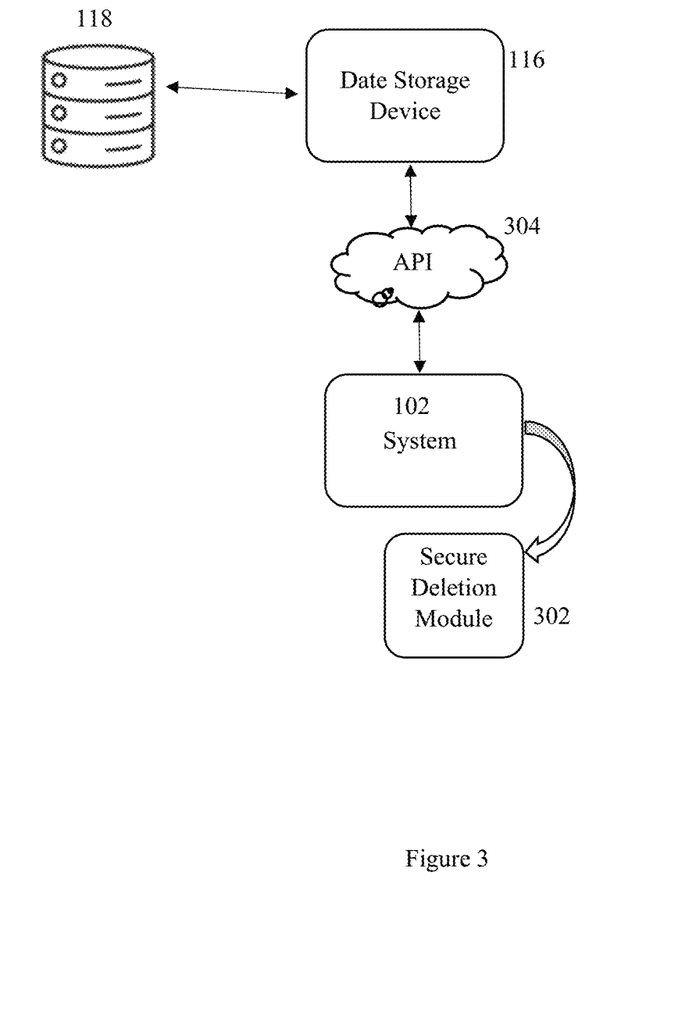
FIG. 3 illustrates interaction of one or more devices of a network to process retrieved PII data in a runtime environment.

FIG. 3 represents an exemplary embodiment showing interaction between one or more devices of the network 100, to process the retrieved PII data in the runtime environment for sending information to the user. The system 102 receives a token corresponding to user data. In response to the reception, the system 102 transmits a request to the data storage device 116 via an API 304, to retrieve PII data from the user data. The data storage device 116 upon verification of the request access an associated database 116 to fetch the required PII data. The fetched PII data is transmitted to the system 102 for processing in a runtime environment. Following the processing of the PII data, the system 102 initiates deletion of the PII data of the user from the runtime environment. The system 102 initiates a process of deletion of via a secure deletion module 302.

Figure 4:
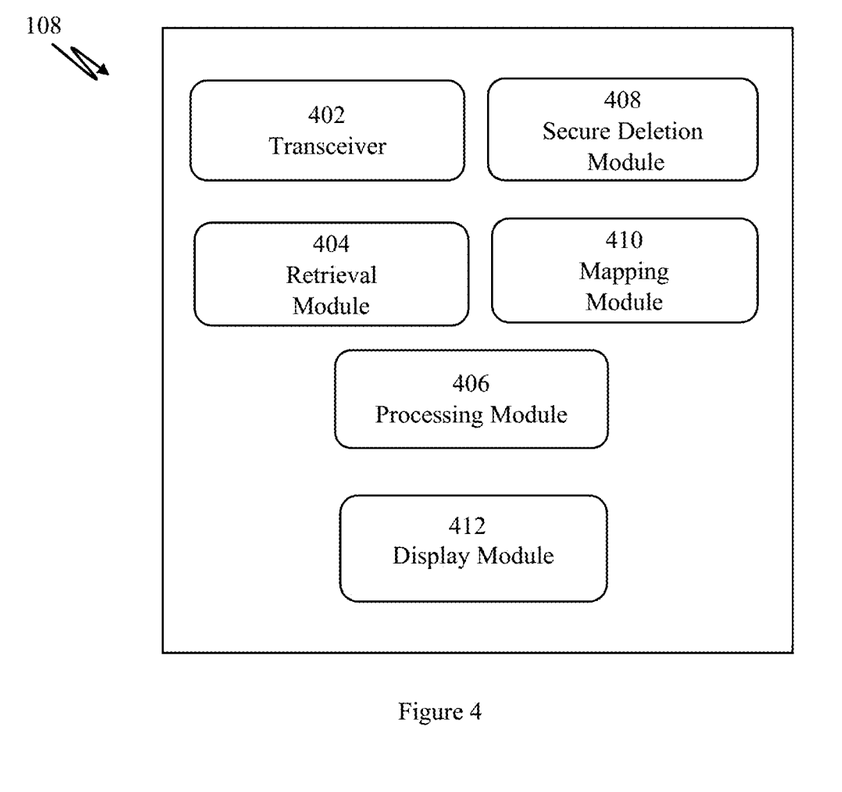
FIG. 4 illustrates an exemplary embodiment of an internal configuration of the system for secure transmission of data.

Referring to FIG. 4 now, the processor 108 of the system 102 comprises one or more module or structural components to perform the one or more steps defined in FIG. 2. In an embodiment, the token corresponding to the user data is received via a transceiver 402. The secure intake of the token is facilitated by the transceiver 402, which acts as a first point of contact between data storage device and the system. In an embodiment, the transceiver may share the token to one or more components to perform one or more steps to check accuracy, consistency, and integrity of the received token. Once the token is checked, the token is shared with the retrieval module 404 to retrieve the PI data of the user. The retrieval module retrieves the PII data via API call. Further the module 406 processes the retrieved PII data, at the runtime environment, to be shared with at least one of the ESP and SSP. The processing module 406 may include one or more processors to perform the processing. Following the transmission, the system securely deletes the PI data at the runtime environment via a secure deletion module 408. Further, mapping of delivery data with the token is performed via a mapping module 410. The analytics analysis is displayed on one or more display device of the system, via display module 412.

The system and method disclosed in the present invention, for securely transmission of data has a variety of applications, for example but not limited to:

1. Personalised marketing campaigns: Businesses frequently use these strategies to interact with their clients. Businesses can provide tailored promos and suggestions to increase consumer engagement by studying user behaviour and preferences without collecting sensitive data.
2. E-learning and online education: By monitoring user progress and customising content, online education systems can offer personalised learning experiences. These systems can provide user performance insights and recommend pertinent courses or content without retaining PII.
3. Health and fitness platforms can offer individualised suggestions based on user input without retaining sensitive health information. These platforms can provide workout programmes, food planning, and health tracking.
4. Travel recommendations: Without retaining personal information, travel websites and platforms can make suggestions for places to stay, things to do, and activities based on user interests and past travels.
5. Aggregation of News and information: Platforms that compile news items, blog posts, or other information can examine user reading patterns to suggest pertinent articles while protecting user privacy.
6. Smart thermostats and lighting systems are examples of IoT devices that may learn user preferences and change settings automatically without storing personal information.
7. Financial planning institutions, like banks, etc. platforms that give financial planning and guidance can examine a user's financial behaviour and make recommendations that are individualised without gaining access to their private financial information.
8. Streaming services can provide tailored music, movie, and TV programme suggestions based on customers' prior viewing habits without retaining any personal information, and the like.

Exemplary embodiments discussed above may provide certain advantages. Though not required to practice aspects of the disclosure, these advantages may include those provided by the following features.

1. Enhanced Privacy and security: PII data is not persistently stored in the system, which significantly decreases the risk of data breaches and unauthorised access. Since there is no sensitive data saved, the potential impact of a security breach is reduced with the disclosed method.
2. Reduced Data Management Complexity: Storing and managing significant amounts of PH data needs strict adherence to data retention policies, regular maintenance, and strong security measures. The complexity of data management and related operational overhead are reduced by avoiding this storage.
3. Less Attractive Target for Attackers: Companies that contain a lot of personally identifiable information (PII) are appealing targets for cyberattacks. The disclosed system is less attractive to hackers looking for important information by not storing this data.
4. Approval Management Simplification: In order to maintain and process users' PII data, privacy requirements frequently call for getting their explicit approval. The requirement to manage and maintain user consent records is diminished by not retaining the data.
5. Focus on Data Minimization: The notion of data minimization places an emphasis on gathering and retaining only the bare minimum data required for a given purpose. Organisations are encouraged to consider carefully what data is actually necessary by not storing PII data.
6. Increasing User Trust and Reputation: Showing a commitment to not storing extraneous user data can increase user trust and reputation. Users are more apt to interact with businesses that value their privacy.

Although implementations for methods and system for processing Personal Identifiable Information (PII) data have been described in language specific to structural features and/or methods, it is to be understood that the appended claims are not necessarily limited to the specific features or methods described. Rather, the specific features and methods are disclosed as examples of implementations for processing Personal Identifiable Information (PII) data.

The invention claimed is:

1. A method for secure transmission of data, comprising: receiving a unique token from a data storage device, wherein the token uniquely identifies user specific data, of a user, stored within the data storage device;

retrieving Personally Identifiable Information (PII) data from the user specific data corresponding to the token through a direct Application Programming Interface (API) call to the data storage device using the token, wherein the token serves as a unique identifier for retrieving the PII data via the API call;

processing the retrieved PII data in a runtime environment in a non-persistent storage for sending one or more customized messages to the user, wherein the processing comprises:

classifying the retrieved PII data into one or more groups based on at least one of demographics, geographic location, and user preferences; and generating the one or more customized messages, in real time, based on the one or more classified groups;

sending the one or more customized messages to at least a service provider;

deleting the retrieved PII data of the user from the runtime environment after sending the one or more customized messages, wherein the deletion includes automatic removal of the PII data from the non-persistent storage; and mapping delivery data corresponding to delivered one or more messages with the token using a unique message ID corresponding to the one or more customized messages information sent, wherein the PII data is deleted from the delivery data.

2. The method as claimed in claim 1 wherein processing the retrieved PII data comprises:

relaying details of information to be sent to at least one of the service provider including an Email Service Provider (ESP) and a SMS Service Provider (SSP), wherein the details include at least one of a schedule for sending the information, a user identifier, the PII data, and the one or more customized messages comprising the information;

receiving the delivery data from at least one of the ESP and the SSP; and deleting the PII data from the delivery data when present, prior to the mapping of the delivery data to the token.

3. The method as claimed in claim 1 wherein the retrieved PII data comprises at least one of a contact number and an email id of the user corresponding to the token received via the API.

4. The method as claimed in claim 1 further comprising: displaying analytics data on a dashboard, wherein the analytics data includes delivery status of the one or more customized messages.

5. The method as claimed in claim 4, wherein the delivery status on the dashboard is displayed using the token and the message ID.

6. The method as claimed in claim 1, wherein the service provider include at least one of an Email Service Provider (ESP) and a SMS Service Provider (SSP).

7. The method as claimed in claim 1, further comprising: receiving one or more tokens for at least one of segmenting, personalizing, and engaging with one or more users without storing PII data in a database.

8. The method as claimed in claim 1, wherein receiving the token is triggered by at least one of a user event and a scheduled event.

9. The method as claimed in claim 1, wherein the delivery data includes at least one of a timestamp, delivery status, and the message ID.

10. The method as claimed in claim 3, wherein the retrieved PII data further includes one or more of postal addresses, Date of Birth, and full name of user.

11. The method as claimed in claim 1, wherein the one or more customized messages are related to an engagement campaign and are relayed to at least one of an Email Service Provider (ESP) and a SMS Service Provider (SSP).

12. The method as claimed in claim 7, wherein the one or more tokens are received for running one or more engagement campaigns.

13. The method as claimed in claim 1, wherein the user data is stored in the data storage device utilizing a cache key.

14. The method as claimed in claim 2, wherein the one or more customized messages relayed to at least one of the ESP and SSP comprises replacement of data in the PII data with the user identifier.

15. The method as claimed in claim 1 further comprising:
comparing a respective hash value of the one or more customized messages to be sent to the user with a respective hash value stored for one or more messages previously sent; and inhibiting sending the one or more customized messages to the user upon a successful match between the compared hash values.

16. A system for secure data transmission, comprising:
a memory storing one or more instructions;
a processor, wherein the processor is communicatively coupled with the memory, and wherein the processor upon execution of the one or more instructions is configured to:

receive a token from a data storage device, wherein the token is a unique identifier that corresponds to user data, of a user, stored in the data storage device;

retrieve Personally Identifiable Information (PII) data from the user data corresponding to the token, wherein the PII data is retrieved via an Application Programming Interface (API) call placed to the data storage device using the token;

process the retrieved PII data in a runtime environment in a non-persistent storage for sending information to the user over one or more customized messages, wherein the processing comprises;

classify the retrieved PII data into one or more groups based on at least one of demographics, geographic location, and user preferences; and generate the one or more customized messages based on the one or more classified groups;

send the one or more customized messages, in real time, to at least a service provider;

delete the retrieved PII data of the user from the runtime environment after sending the one or more customized message, wherein deletion includes automatic removal of the PII data from the non-persistent storage; and map delivery data corresponding to delivered one or more messages with the token using a unique message ID corresponding to the information sent, wherein the PII data is deleted from the delivery data.

* * * * *